United States Patent
Zielinski

(10) Patent No.: US 6,705,451 B2
(45) Date of Patent: Mar. 16, 2004

(54) METHOD AND APPARATUS FOR DISTRIBUTING ARTICLES FROM A CONVEYOR

(75) Inventor: Artur Zielinski, 670 NE. 56 Ct, Fort Lauderdale, FL (US) 33334

(73) Assignee: Artur Zielinski, Fort Lauderdale, FL (US)

( * ) Notice: Subject to any disclaimer, the term of this patent is extended or adjusted under 35 U.S.C. 154(b) by 0 days.

(21) Appl. No.: 09/681,252

(22) Filed: Mar. 8, 2001

(65) Prior Publication Data

US 2002/0125101 A1 Sep. 12, 2002

(51) Int. Cl.[7] .............................................. B65G 37/00
(52) U.S. Cl. ....................................................... 198/364
(58) Field of Search ................................. 198/364, 367, 198/622, 635, 637

(56) References Cited

U.S. PATENT DOCUMENTS

| | | | | |
|---|---|---|---|---|
| 3,522,876 A | * | 8/1970 | Purdy | 198/188 |
| 4,754,864 A | * | 7/1988 | Cross, Jr. | 198/364 |
| 4,763,770 A | * | 8/1988 | Zagorzycki | 198/364 |
| 4,911,281 A | * | 3/1990 | Jenkner | 198/364 |
| 6,026,947 A | * | 2/2000 | Persson | 198/364 |
| 6,059,092 A | * | 5/2000 | Jerue et al. | 198/364 |
| 6,182,812 B1 | * | 2/2001 | Hartness, III et al. | 198/364 |

* cited by examiner

Primary Examiner—Douglas Hess

(57) ABSTRACT

Disclosed is a method and an apparatus for distributing articles using a mobile device equipped with one or two ejectors, capable of removing the required number of distributed articles from a conveyor sequentially, into collection containers in designated collection zones located on one or both sides of the conveyor. These zones may be defined according to the size of collection bins or packing boxes used, allowing the distribution of articles in a wide range of sizes. This method allows the building of a very flexible and very economical distributing conveyor systems, due to the fact that only one mobile device is used instead of a number of fixed diverting stations mounted on one or both sides of the conveyor.

1 Claim, 9 Drawing Sheets

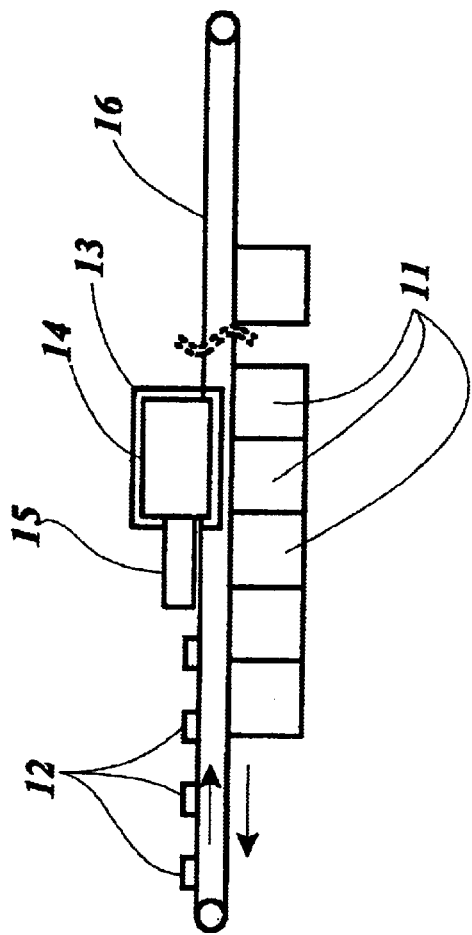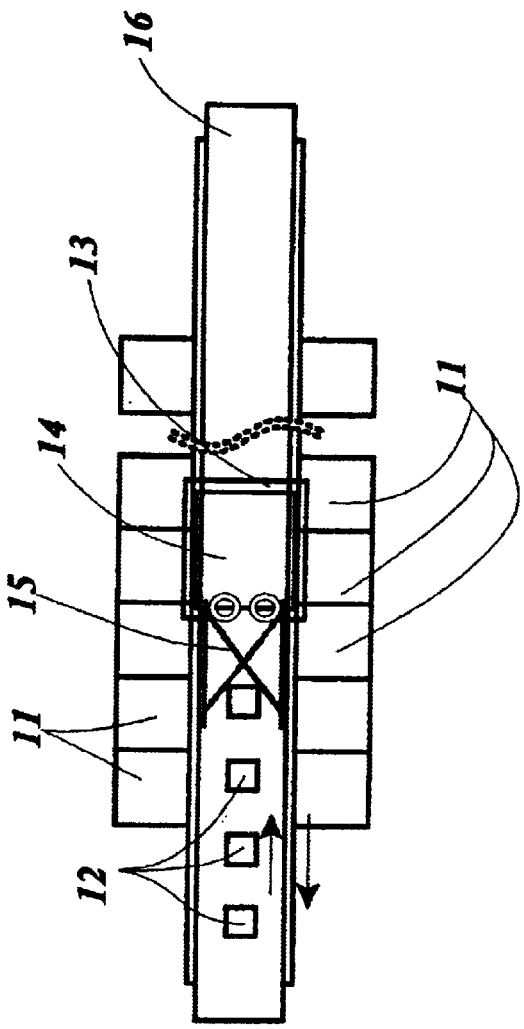
Fig. 1a
Fig. 1b

METHOD AND APPARATUS FOR DISTRIBUTING ARTICLES FROM A CONVEYOR

BACKGROUND OF INVENTION

The invention relates to the distribution of articles from a conveyor system.

At a present time articles are distributed or sorted by the systems that employ a multitude of diverting or ejecting devices located along the conveyor which direct the desired articles into designated collection containers. Such systems, usually custom made for predefined articles and sizes of collecting containers are very expensive. Due to the cost only the larger distribution companies can afford this type of automation.

In case of distributing articles in groups of the same type, where sorting the articles of various type is not a required function, such an expensive and complex system may be replaced with a simpler, more economic one. The present invention utilizes one mobile device with one or two ejectors mounted on it, capable of removing the required number of distributed articles from a conveyor sequentially into container in designated collection zones located along the conveyor.

SUMMARY OF INVENTION

The general idea of the invention is a method of distributing articles placed on the conveyor using a mobile apparatus able to move along or upon a conveyor and able to remove the articles from the conveyor into containers located in designated discharge zones.

Objects and Advantages: Several objects and advantages of the invention are: The ability to build extremely cost effective distributing conveyor systems due to the usage of only one mobile device to remove articles from the conveyor.

The ability to build flexible distributing conveyor systems permitting a wide range of articles and collection container sizes, due to software definable length and location of the collection zones.

The ability to upgrade existing conveyor systems by converting them to distributing conveyor systems.

BRIEF DESCRIPTION OF DRAWINGS

In the drawings, closely related figures have the same numbers but different alphabetic suffixes.

FIG. 1A and FIG. 1B respectively, show side and top schematic views used to explain the principals of the present invention.

DETAILED DESCRIPTION

Figure 6:
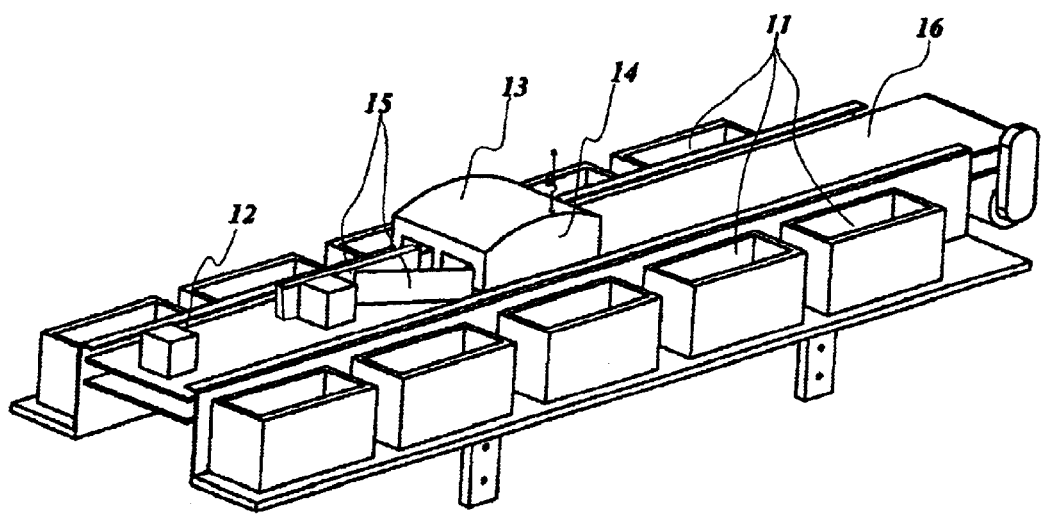
FIG. 6 shows a three dimensional rendering of the preferred embodiment of the present invention.

Herein, there follows a description of a preferred embodiment of a method and an apparatus for distributing the articles by ejecting them from a conveyor. In this description downstream means the direction of run of the conveyor while upstream means the opposite direction. Referring to FIGS. 1A, 1B and FIG. 6, a conveyor 16 is shown with a mobile apparatus 13, comprising carrier 14 and ejectors 15, presented in the form of moving arms. Articles to be distributed 12 are placed on the powered conveyor belt 26 (FIGS. 2A and 2C) and approaching the apparatus 13, stopped in a designated collection zone. As soon as a brake-a-beam sensor 48 (FIGS. 3A and 3B) sees the article 12, the pre-calculated time delay begins to be counted. Upon conclusion of the time delay the ejector 15 ejects the product out of the conveyor 16 so that it falls into the collection container 11, at the designated collection zone. If there are more articles to be distributed in this zone, the arms 15 return to the previous position and repeat the process. In case the article to be ejected is on the opposite side of the conveyor 16, the arms 15 remain in their last position and ejects the article when it arrives. In case the next desired collection zone is one or more zones downstream along the conveyor 16, the apparatus 13, using its own propulsion moves downstream faster than the conveyor's belt 26 (FIGS. 2A and 2C), stops in the desired collection zone, sets the ejectors 15 to the opposite side of the conveyor 16, where the zone is located, and distributes the desired number of articles. This process repeats until all articles 12 are distributed. Additional articles placed on the conveyor (if any) are collected in the last collection box placed in the last collection zone. After this, the mobile apparatus 13 moves upstream until it reaches the initial collection zone where the front end sensor 49 (FIGS. 3A and 3B), detects the front limit magnet 27 (FIGS. 2A and 2B), and stops the apparatus 13. The length of the collection zones is flexible and defined by the user to accommodate various sizes of collection bins or shipping boxes. The mobile apparatus 13 may move independently along the conveyor, on the conveyor body, or even run on the moving conveyor's belt.

Figure 2A:
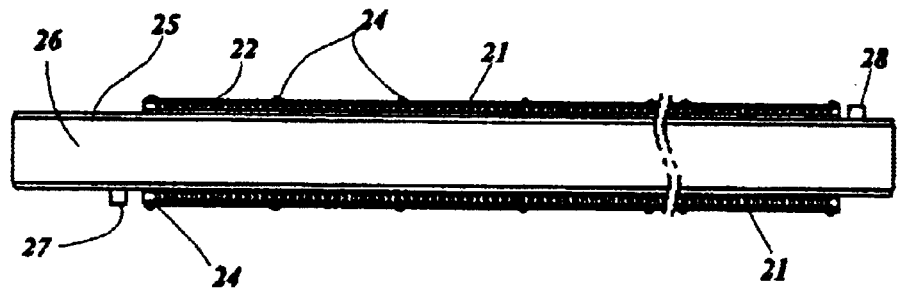
FIGS. 2A to 2C respectively, show top view, side view, and cross-section of employed conveyor in the line 1—1, with the rails supporting and powering the mobile distributing apparatus.
Figure 2B:
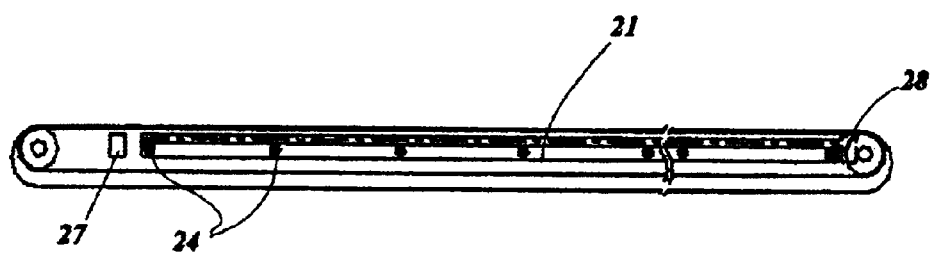
Figure 2C:
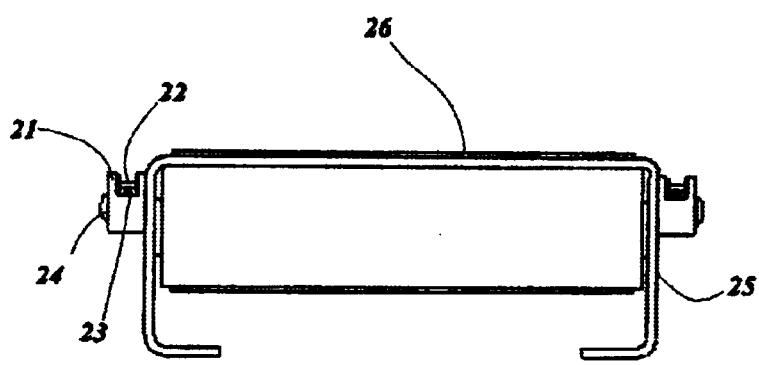

Referring to FIGS. 2A, 2B, and 2C a preferred embodiment is shown with the supporting plastic rails 21 mounted on both sides of the conveyor body 25 with screws 24. Each rail 21 is holding the chain 22 in the slots located on the top. The bare braided copper wire 23 is placed under each chain.

Figure 3A:
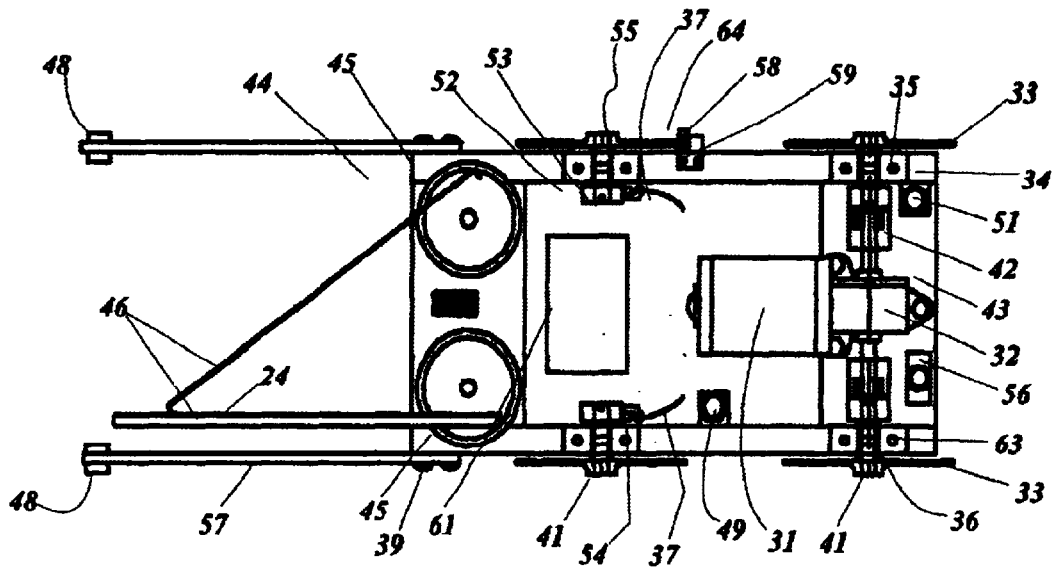
FIGS. 3A to 3B respectively, show top view and side view of a mobile distributing apparatus in preferred embodiment of the present invention mentioned in the claim 3.
Figure 3B:
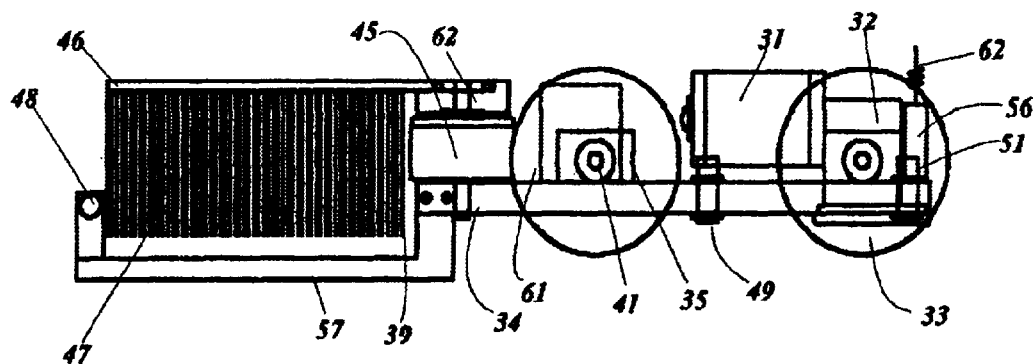

Referring to FIGS. 3A and 3B, top and side view of the apparatus 13 (FIGS. 1A and 1B) is shown in detail. The brass tooth wheels 33 of the apparatus run on chains 22 (FIGS. 2A and 2C). The gear teeth of the wheel 33 are detected by a sensor 64 mounted on the bracket 58 and held by screws 59. The tooth count is used to determine the position of the apparatus 13 over the conveyor 16 (FIGS. 1A and 1B). The wheels 33 are mounted on steel axis 41, held by two brass bushings 36, mounted in plastic bushing holders 35, and secured with screws 63.

The apparatus is powered with low DC voltage by an external power supply connected to two heavy braided bare copper wires 23 (FIG. 2C), contacting wheels 33 through the links of the chain 22 (FIGS. 2A and 2C). The supply voltage is collected by two brushes 54 from the brass rings 52, which are mounted on two of the four axis 41. They are located on each side of the apparatus and secured with set screws 53.

The brushes 54 are equipped with the springs 55 and connected with wires 37 to the programmable logic controller (PLC) 61. The remaining two axis 41 are coupled with the gear box 32 of the direct current electric motor 31, with the three piece jaw coupling 42. The rubber element between the jaws provides the necessary electrical isolation between the axis on both sides. The steel washers 38 are applied between brass rings 52 and plastic brackets 35 as well as between the jaw clutches 42 and plastic brackets 35.

The ejecting mechanism of the apparatus consists of two electromagnetic coils 45 being a type of electric rotary actuators mentioned in the claim 3. This coils are wired to the PLC 61. Each coil 45 is mounted on the holder 44, and equipped with an ejecting brush 47. The brush 47 is mounted on an aluminum arm 46 and connected to the coil shaft with an aluminum bracket 62. The apparatus 13 (FIGS. 1A and 1B) is quipped with a front limit sensor 49 and an end limit sensor 51. Both sensors 49 and 51 are magnetic type. Sensor 49 detects the magnet 27 mounted on the front (FIGS. 2A and 2B) while the sensor 51 detects the magnet 28 mounted on the end (FIGS. 2A and 2B) of the conveyor 16 (FIGS. 1A and 1B) thus limiting the range of the movement of the apparatus on the conveyor. Articles to be distributed 12 (FIGS. 1A and 1B) arrive on the conveyor 16 and are detected by a see-through sensor 48, mounted on the bracket 57 and attached to the side bars 34 with screws 39.

Figure 4:
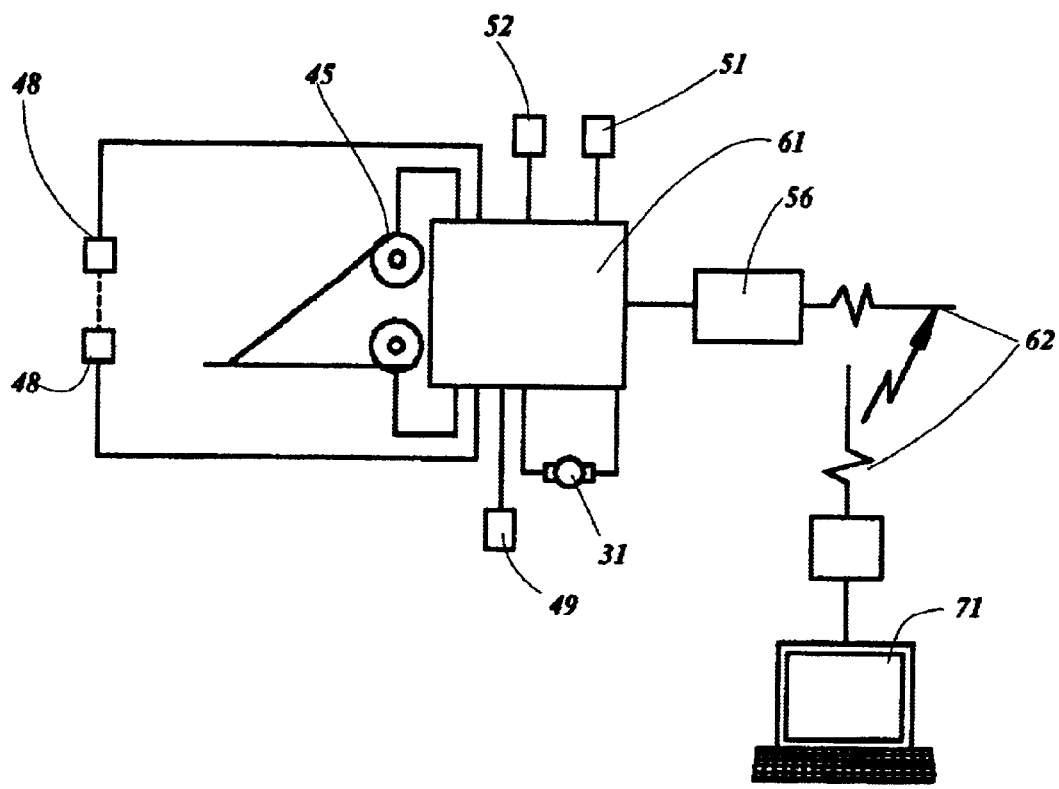
FIG. 4 shows a block diagram of the circuit controlling the distributing apparatus shown in FIGS. 3A and 3B.
Figure 5:
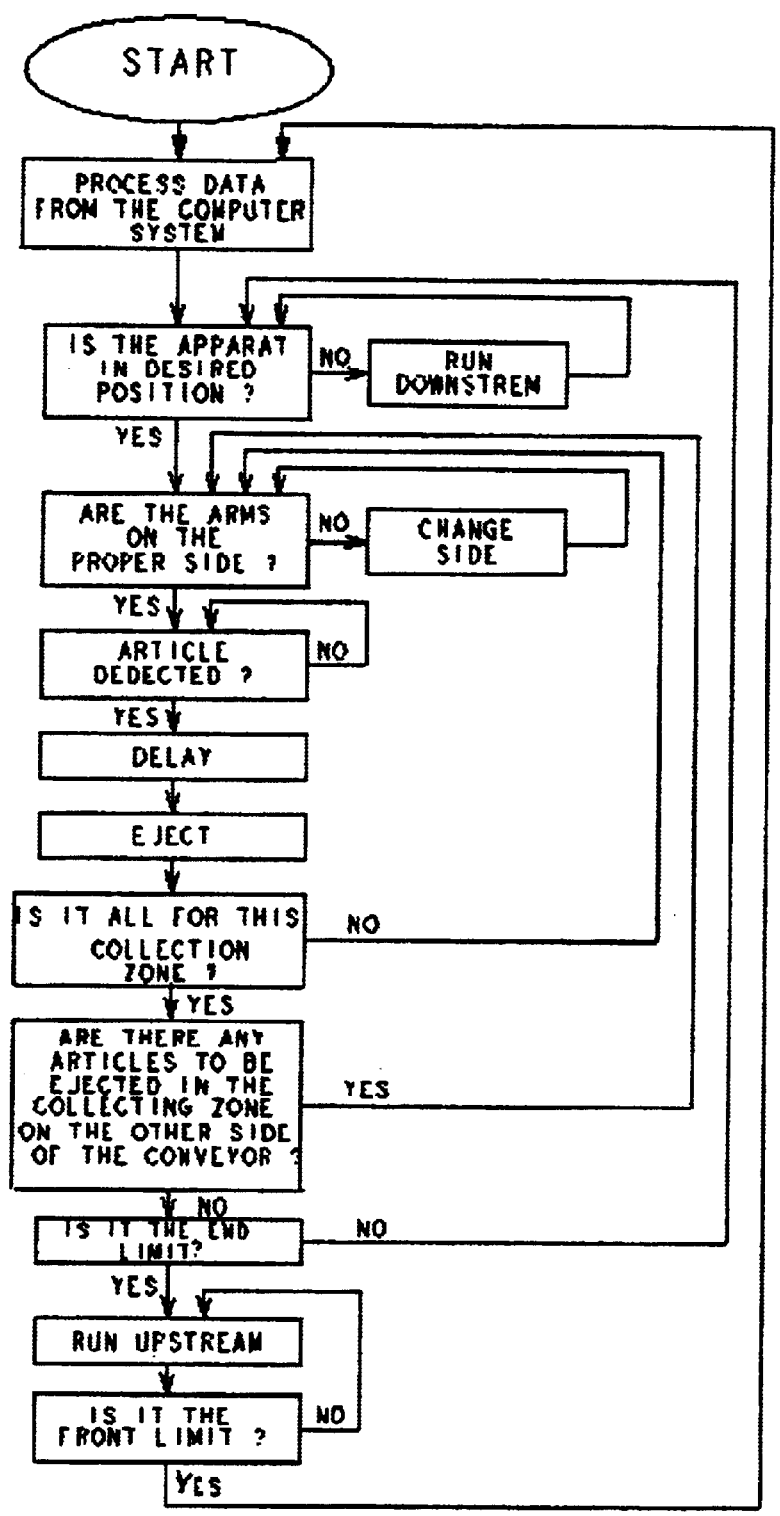
FIG. 5 shows a software flowchart of a program for a programmable logic controller 61 (PLC), shown in FIGS. 3A, 3B and FIG. 4.

Referring to FIG. 4 the block diagram of the apparatus 13 (FIGS. 1A and 1B) is shown. Block 61 (FIGS. 3A, 3B, and 4) is a digital controller, which may be a programmable logic controller (PLC), or another electronic control circuit based on a microprocessor. Methods for programming such devices are conventional and known to those skilled in the art, however, a flowchart of such a program is shown in FIG. 5 and described further. The PLC receives signals from the see-through type sensor 48, the front limit sensor 49, the end limit sensor 51, and the gear tooth sensor 52. Both coils 45, which drive the ejector arms, are connected to the power outputs of the PLC 61, as well as electric motor 31. The number of articles to distribute, and the number of gear teeth the apparatus 13 (FIGS. 1A and 1B) is to travel to reach the desired collection zone are transmitted from the computer system 71 via radio frequency data link 56 equipped with the antenna 62. The link transmits this data to the PLC as well as receives the confirmation from the PLC.

FIG. 5 presents the flowchart of a PLC program. The PLC receives data from the computer system and check if the apparatus is in the desired position on the conveyor, i.e. in the desired collection zone. In case it is not, the motor moves the apparatus downstream at the speed higher than the movement of the belt. The PLC counts pulses from the gear tooth sensors until they reach the number demanded by the computer system. As soon as the apparatus is in position it sets the ejecting arms to the opposite side of the desired collection zone and waits for the article to arrive on the conveyor belt. The arriving article brakes the beam of the article sensor 48 (FIGS. 3A, 3B and 4) and starts the preset time delay. This delay is long enough to allow the article to be entirely within the range of the ejecting arm. When the delay expires the arm ejects the article and the program checks if all articles were ejected in this collection zone. In case of more articles the arms withdraw to their previous position and wait for the next article to arrive. If there are no additional articles to be ejected, the arms remain in their last position and the program checks to see if there are any articles to be ejected in the collection zone on the other side of the conveyor. The program checks if the arms are in their proper position, sets them if necessary and ejects the articles. In the event that there are no articles to be ejected on the opposite side of the conveyor, the apparatus is moved to the next desired location and distributes the articles there, until the apparatus reaches the end limit. From this location the apparatus runs upstream the conveyor until it reaches the front limit and the distribution process may be repeated for other types of articles.

Figure 7:
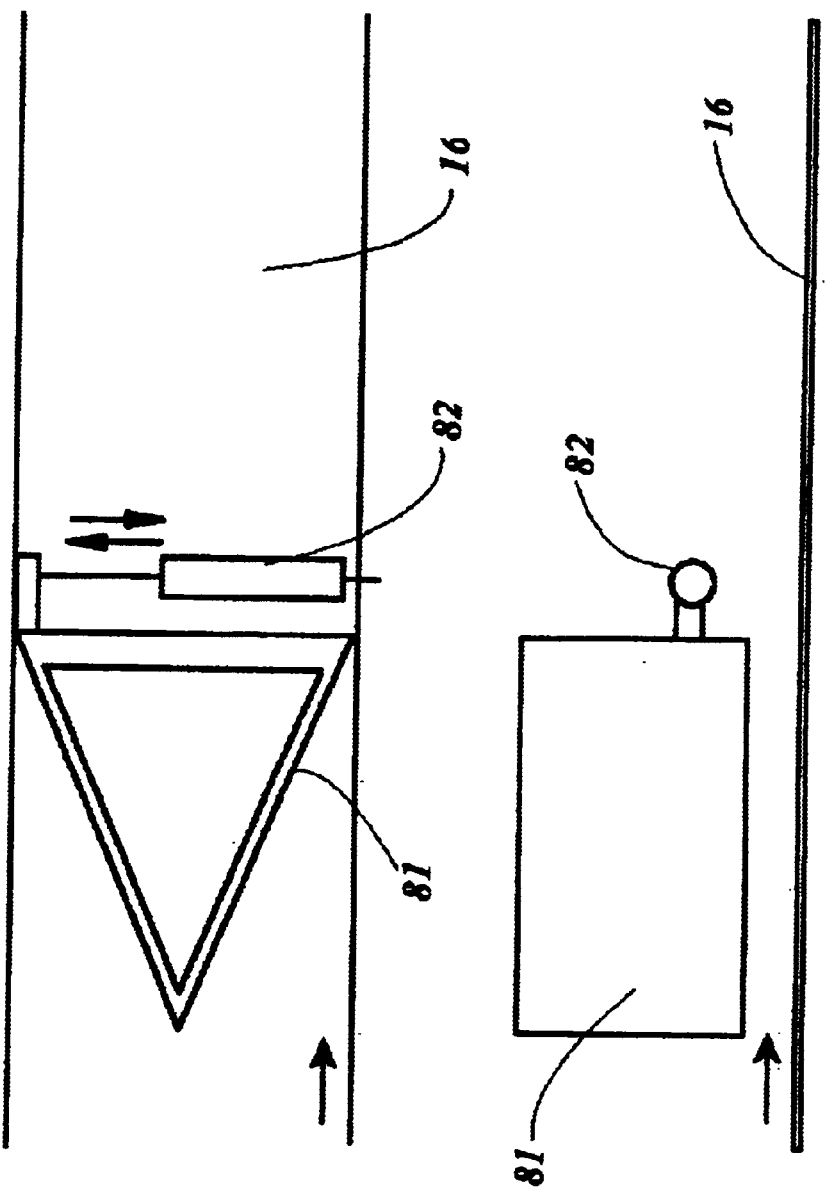
FIG. 7 shows top and side view of the embodiment mentioned in the claim 4.

The second preferred embodiment mentioned in the claim 4 is similar to the first embodiment shown in drawings FIG. 1 to FIG. 6 except the means of ejection which are arranged in the form of a triangular diverter 81, driven transversally to the conveyor 16 by a linear actuator 82 as shown in FIGS. 7A and 7B.

Figure 8:
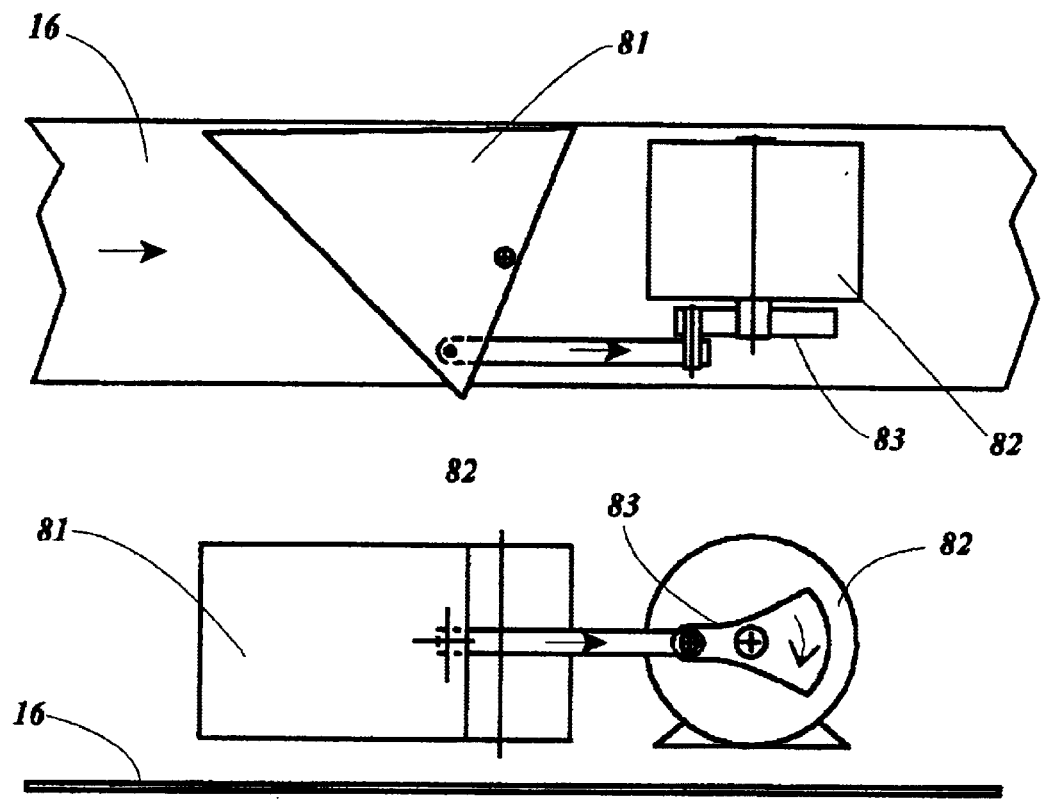
FIG. 8 shows top and side views of the embodiment mentioned in the claim 5.

The third preferred embodiment mentioned in the claim 5 is similar to the first embodiment shown in drawings FIG. 1 to FIG. 6 except the means of ejection which are arranged in the form of pivoting triangular diverter 81, pivoting on the shaft of a rotary actuator. Drawings FIG. 8A and FIG. 8B show two electrical coils 45 in the configuration where they work against each other as an example of such actuator. This may be accomplished by any other type of rotary actuator as well.

Figure 9A:
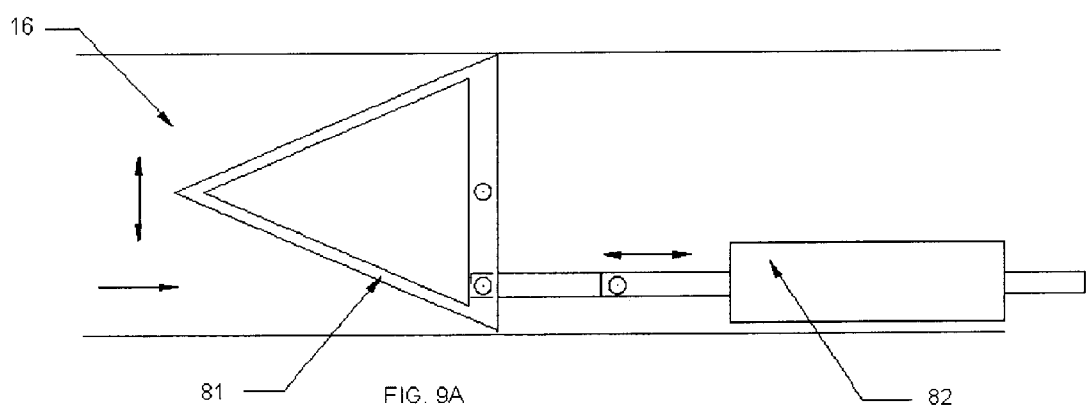
FIG. 9 shows top and side views of the embodiment mentioned in the claim 6.
Figure 9B:
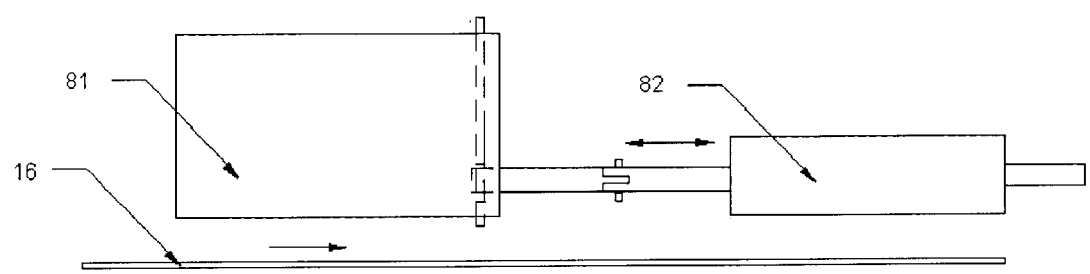

The fourth preferred embodiment mentioned in the claim 6 is similar to the first embodiment shown in drawings FIG. 1 to FIG. 6 except the means of ejection which are arranged in the form of pivoting triangular diverter 81, driven by a linear actuator 82, as shown in FIGS. 9A and 9B.

The present invention is not limited to the above mentioned embodiments. Additional advantages and modifications will readily occur to those skilled in the art. Therefore, the invention in its broader aspects is not limited to the specific details and representative devices shown and described herein. Accordingly, various modifications may be made without departing from the spirit or scope of the general inventive concept as defined by the appended claims and their equivalents.

What is claimed is:

1. An apparatus for distributing articles being transported in a powered conveyor the apparatus comprising:
    a mobile self-propelled carrier capable of moving on said conveyor;
    an ejector placed on said mobile carrier for removing said articles from said conveyor and;
    a control system capable of determining a position of said carrier on said conveyor and capable of detecting and ejecting a required number of said articles in a plurality of designated discharge zones located along the length of said conveyor.

* * * * *